United States Patent
Abdallah et al.

(10) Patent No.: US 11,638,995 B2
(45) Date of Patent: May 2, 2023

(54) COMPLIANT PAYLOAD PRESENTATION USING ROBOTIC SYSTEM WITH COORDINATED SERIAL AND PARALLEL ROBOTS

(71) Applicant: GM GLOBAL TECHNOLOGY OPERATIONS LLC, Detroit, MI (US)

(72) Inventors: Muhammad E. Abdallah, Rochester Hills, MI (US); Miguel Arturo Saez, Clarkston, MI (US); James W. Wells, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 17/305,348

(22) Filed: Jul. 6, 2021

(65) Prior Publication Data
US 2023/0012386 A1    Jan. 12, 2023

(51) Int. Cl.
*B25J 9/16* (2006.01)
*B62D 65/00* (2006.01)
*B25J 13/08* (2006.01)

(52) U.S. Cl.
CPC ............. *B25J 9/1682* (2013.01); *B25J 9/163* (2013.01); *B25J 9/1623* (2013.01); *B25J 9/1633* (2013.01);
(Continued)

(58) Field of Classification Search
CPC ........ B25J 9/1682; B25J 9/1623; B25J 9/163; B25J 9/1633; B25J 9/1664; B25J 9/1674;
(Continued)

(56) References Cited

U.S. PATENT DOCUMENTS

| 4,536,690 | A | * | 8/1985 | Belsterling | ............ B62D 57/02 318/687 |
| 5,596,683 | A | * | 1/1997 | Kasagami | .............. B25J 9/1682 901/3 |

(Continued)

OTHER PUBLICATIONS

Markus Frietsch, Stefan Vorndran. Hexapod Robot Applications in Automotive Assembly, https://www.pi-usa.us/en/tech-blog/precision-robotics-and-automation-hexapods-advance-production-processes (Year: 2019).*

(Continued)

*Primary Examiner* — Adam R Mott
*Assistant Examiner* — Matthew C Gammon
(74) *Attorney, Agent, or Firm* — Quinn IP Law

(57) ABSTRACT

A robotic system for presenting a payload within a workspace includes a pair of serial robots configured to connect to the payload, a parallel robot coupled to a distal end of one of the serial robots such that the parallel robot is disposed between the distal end and the payload, a sensor situated within a kinematic chain extending between the distal end and the payload, and a robot control system (RCS). The sensor outputs a sensor signal indicative of a measured property of the payload. The RCS includes a coordinated motion controller configured to control the serial robots, and a corrective motion controller configured to control the parallel robot. Parallel robot control occurs in response to the sensor signal concurrently with control of the serial robots in order to thereby modify the property of the payload in real-time.

20 Claims, 3 Drawing Sheets

(52) U.S. Cl.
CPC ........... *B25J 9/1664* (2013.01); *B25J 9/1674* (2013.01); *B25J 13/082* (2013.01); *B62D 65/00* (2013.01)

(58) Field of Classification Search
CPC .... B25J 13/082; B25J 13/085; B25J 17/0216; B25J 9/0084; B62D 65/00
See application file for complete search history.

(56) References Cited

U.S. PATENT DOCUMENTS

| | | | | |
|---|---|---|---|---|
| 2009/0123264 | A1* | 5/2009 | Hartmann | B25J 9/1682 414/798.2 |
| 2015/0118003 | A1* | 4/2015 | Bacalia | B25J 9/00 414/816 |
| 2021/0154950 | A1* | 5/2021 | Czinger | B25J 9/0084 |
| 2021/0229265 | A1* | 7/2021 | Xie | B25J 11/0065 |
| 2022/0226990 | A1* | 7/2022 | Wu | B25J 9/023 |

OTHER PUBLICATIONS

Markus Frietsch, Stefan Vorndran. Precision Robotics and Automation: Hexapods Advance Production Processes, https://www.pi-usa.us/en/tech-blog/precision-robotics-and-automation-hexapods-advance-production-processes (Year: 2019).*

Friedrich C, Ihlenfeldt S. Model Calibration for a Rigid Hexapod-Based End-Effector with Integrated Force Sensors. Sensors. 2021; 21(10):3537. https://doi.org/10.3390/s21103537 (Year: 2021).*

* cited by examiner

COMPLIANT PAYLOAD PRESENTATION USING ROBOTIC SYSTEM WITH COORDINATED SERIAL AND PARALLEL ROBOTS

INTRODUCTION

The present disclosure relates to robotic systems and associated control architectures and methodologies for compliantly presenting a relatively rigid/non-compliant payload within a designated workspace.

Multi-arm robotic systems are commonly used during manufacturing and assembly in a host of industries in order to manipulate heavy or otherwise cumbersome payloads. When two or more robots simultaneously operate when presenting the payload, e.g., by securely grasping, lifting/raising, lowering, and orienting the payload within the workspace, the robots are considered to be collaborating or cooperating in the performance of the work task. The associated control strategy used to govern operation of the robots in such a work environment is therefore referred to in the art as cooperative payload control.

SUMMARY

Described herein are robotic systems and related cooperative control methodologies for presenting a payload within a three-dimensional workspace using multiple robot types, including at least two serial robots and at least one parallel robot. The payload contemplated herein may be embodied as a relatively large, rigid, and cumbersome object, for instance a partially-assembled or fully-assembled vehicle chassis. Relative to resilient or compliant payloads having a structure able to bend, flex, or otherwise absorb forces imparted during robot-based payload presentation, a rigid payload of the contemplated type is more susceptible to strain-related damage. Undue strain may result at times due to slight or gross position errors encountered during positioning/presentation control maneuvers, as well as during the subsequent performance of work tasks on the presented payload.

As appreciated in the art, serial robots such as six degree of freedom ("6-DoF") articulated industrial robots use an open kinematic chain in which six individual joints and the various arm segments or links of the robot are connected in series with each other. The term "open-chain" is thus commonly used to refer to the particular kinematic chain in which a distal end link is connected to a single revolute joint. In contrast, parallel robots typically employ a closed-chain kinematic configuration in which the constituent joints and links of the parallel robot are connected in parallel. Thus, a distal end of a given link of a parallel robot may be connected to multiple revolute joints. Although parallel robots tend to be smaller and more responsive than serial robots, the closed-chain kinematics of the parallel robot generally result in a reduced range of motion and increased operating stiffness relative to an open kinematic chain.

The solutions described herein are thus intended to enable a rigid payload to be gently moved and accurately positioned within the workspace, i.e., in an optimally compliant manner for protection of the payload. The desired movement is achieved using a scalable control architecture in which the collective motion of three or more robots, i.e., the at least two serial robots and the at least one parallel robot noted above, is controlled by operation of a distributed control system. As part of this strategy, robot-specific motions and force actions are closely monitored and regulated in real-time by an associated control unit ("controller") to impart gentle motion to the payload within the defined workspace.

With respect to the control system, a first electronic control unit, which is referred to hereinafter for clarity as the "coordinated motion controller" within the architecture of a robotic control system (RCS), coordinates the gross and fine motions of constituent joints of the serial robots. The serial robots are relatively large and heavy devices, and thus tend to possess greater inertia and correspondingly slower response times than the parallel robot(s) used herein. The RCS also includes a second electronic control unit, i.e., the "corrective motion controller" of the RCS framework, with this additional controller operating on the joints of the smaller/lower inertia parallel robot simultaneously with ongoing control of the serial robots by the coordinated motion controller. Together, the robotic-specific controllers ensure compliant coordinated control of the different robots, in real-time, while protecting the structural integrity of the payload from undue strain caused by transient or sustained position errors.

In a non-limiting exemplary configuration, the robotic system includes a pair of serial robots, a parallel robot, a force sensor, and the RCS, the latter having constituent coordinated and corrective motion controllers. The serial robots are configured to cooperatively engage with and present the payload within the workspace. The parallel robot is connected to a distal end of one of the serial robots, e.g., via a gripper or other suitable end-effector, such that the parallel robot is disposed between the distal end and the payload. The force sensor, which is situated within a kinematic chain extending between the distal end and the payload, is configured to output a force signal indicative of a strain on the payload.

The coordinated motion controller in this embodiment is configured to control multi-axial motion of the serial robots within the workspace. This occurs via a first set of actuator control signals. The corrective motion controller is configured to control multi-axial motion of the parallel robot, via a second set of actuator control signals, in response to a force signal from the force sensor, and concurrently with the control of the multi-axial motion of the pair of serial robots, to thereby reduce the strain on the payload in real-time.

The parallel robot may be optionally embodied as a Stewart platform in a non-limiting exemplary configuration. Delta robots or other suitable parallel robot mechanisms may be used in other embodiments.

Within the scope of the disclosure, an additional serial robot may be in communication with the serial robots and the parallel robot, with the additional serial robot performing a work operation on the payload within the workspace. In the case of the payload being a vehicle chassis, for instance, the additional serial robot may be optionally embodied as a welding robot operable for performing a welding operation on the vehicle chassis.

The RCS in another aspect of the disclosure may be configured to determine a weight of the payload based on an actual position of the serial robots and the parallel robot, and to thereafter use the derived weight within an impedance control model or framework to determine the second set of actuator control signals. This action allows the elevation of the payload above ground level to be properly compensated for.

The parallel robot may optionally include two or more parallel robots, each of which is connected to a corresponding distal end of a respective one of the pair of serial robots.

Embodiments are disclosed herein in which the corrective motion controller is configured, in response to an emergency stop ("e-stop") signal from an e-stop device, to control the multi-axial motion of the parallel robot to a default stop position that is protective of the payload.

In response to a control mode transition signal, the corrective motion controller may be optionally configured to transition between a position control mode in which the parallel robot assumes a commanded position relative to the payload, and a force control mode in which the parallel robot applies a commanded force to the payload.

A robotic control system is also described herein for use with a robot system having two serial robots and a parallel robot when presenting a payload within a workspace. The parallel robot in this control context is disposed between the payload and a distal end of one of the serial robots. The system according to an exemplary embodiment includes the coordinated motion controller and the corrective motion controller. The coordinated motion controller is configured to generate a first set of actuator control signals to control multi-axial motion of the serial robots when presenting the payload within the workspace. In contrast, the corrective motion controller is in communication with the coordinated motion controller and is configured, in response to a force signal indicative of strain on the payload, to output a second set of actuator control signals configured to control multi-axial motion of a parallel robot concurrently with the multi-axial motion of the serial robots.

Also disclosed herein is a related method for presenting the payload within the workspace. A representative embodiment of the method includes connecting a parallel robot to a distal end of a first serial robot, and connecting the parallel robot to the payload, such that the parallel robot is disposed between the distal end and the payload. The method also includes connecting a second serial robot to the payload. Once the robots have been connected in this manner, the method includes cooperatively controlling motion of the first serial robot, the second serial robot, and the parallel robot via a robot control system. This entails outputting, via a force sensor situated within a kinematic chain extending between the distal end and the payload, a force signal indicative of an actual strain on the payload.

The method thereafter includes controlling, via a first set of actuator control signals, multi-axial motion of the first serial robot and the second serial robot using a coordinated motion controller of the robot control system. Likewise, the method includes controlling, via a second set of actuator control signals, multi-axial motion of the parallel robot in response to the force signal concurrently with the control of the multi-axial motion of the first serial robot and the second serial robot to thereby reduce the strain on the payload in real-time.

The above-described features and advantages and other possible features and advantages of the present disclosure will be apparent from the following detailed description of the best modes for carrying out the disclosure when taken in connection with the accompanying drawings.

DETAILED DESCRIPTION

Figure 1:
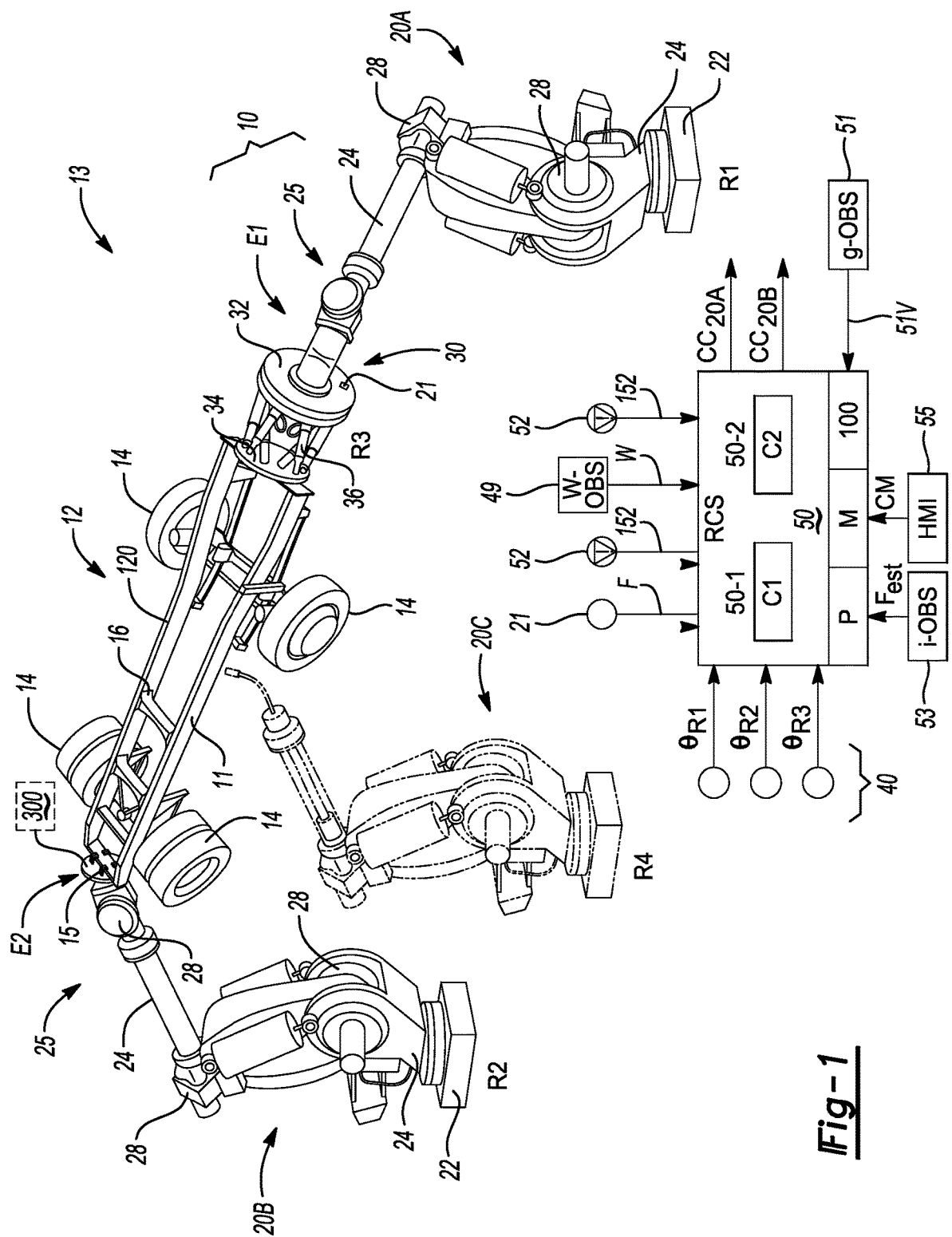
FIG. 1 is an illustration of a robotic system and a related control system configured to provide compliant coordinated control of a rigid payload using serial and parallel robots in accordance with the subject disclosure.

Embodiments of the present disclosure are described herein. It is to be understood, however, that the disclosed embodiments are merely examples, and that other embodiments can take various and alternative forms. The Figures are not necessarily to scale. Some features may be exaggerated or minimized to show details of particular components. Therefore, specific structural and functional details set forth herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference, which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring to FIG. 1, a robotic system 10 is configured for presenting a payload 12 within a workspace 13 with the assistance of a robot control system (RCS) 50. In the representative embodiment of FIG. 1, the payload 12 is a vehicle chassis 120 having longitudinal rails 11 that are laterally supported by crossbeams 16, with the rails 11 and crossbeams 16 being constructed of aluminum, steel, or another rigid/non-compliant material. Wheels 14 may be attached to the vehicle chassis 120 depending on the stage of manufacturing. While the vehicle chassis 120 is representative of the type of rigid/non-compliant payload structure contemplated herein, other payloads 12 may be presented in other applications of the present teachings, and therefore the vehicle chassis 120 is merely exemplary and non-limiting.

The robotic system 10 includes a pair of serial robots 20A and 20B, also labeled R1 and R2 for clarity, which in turn are configured to connect to the payload 12 either directly or indirectly. As understood in the art, such connection may be achieved via a gripper 15, e.g., a multi-fingered claw, clamp, or other suitable end-effector. Additionally, a parallel robot 30 (R3) is connected to a distal end of one of the serial robots 20A or 20B, in this instance to a distal end E1 of the serial robot 20A, using a similar gripper 15 or other suitable end-effector. Other embodiments may be implemented in which the parallel robot 30 is coupled to a distal end E2 of the serial robot 20B, as well as embodiments in which both of the serial robots 20A and 20B are connected to a respective parallel robot 30, with such an option illustrated in FIG. 1 as serial robot 300. When the parallel robot 30 is connected to the distal end E1 in this manner, the parallel robot 30 is disposed between the distal end E1 and the payload 12 as shown.

The robotic system 10 of FIG. 1 also includes a force sensor 21, such as a pressure transducer or a piezoelectric sensor, that is situated within a kinematic chain extending between the distal end E1 and the payload 12, e.g., attached to a linkage of the parallel robot 30 or integral therewith. The force sensor 21 is configured to output a force signal (arrow F) indicative of a measured strain on the payload 12. The force signal (arrow F) is ultimately communicated to the RCS 50 over suitable transfer conductors (not shown), wirelessly, or both.

As depicted, the RCS 50 includes a coordinated motion controller (C1) 50-1 and a corrective motion controller (C2) 50-2. The coordinated motion controller 50-1, which is in communication with the pair of serial robots 20A and 20B, controls multi-axial motion thereof within the workspace 13 via a first set of actuator control signals (arrow $CC_{20A}$). In contrast, the corrective motion controller 50-2 is in communication with the parallel robot 30 and the force sensor 21, and is configured to control multi-axial motion of the parallel robot 30 via a second set of actuator control signals (arrow $CC_{20B}$). This action, which occurs in response to the force signal (arrow F) concurrently with the control of the multi-axial motion of the serial robots 20A and 20B, has the effect of reducing undue strain on the payload 12 in real-time.

The RCS 50 of FIG. 1 may be embodied as one or more digital computers each having a processor (P) and memory (M). The memory (M) includes sufficient amounts of tangible, non-transitory memory, e.g., read only memory, flash memory, optical and/or magnetic memory, electrically-programmable read only memory, and the like, i.e., computer-readable media. The memory (M) also includes sufficient transient memory such as random access memory, electronic buffers. Hardware of the robot control system 50 may include a high-speed clock, analog-to-digital and digital-to-analog circuitry, and input/output circuitry and devices, as well as appropriate signal conditioning and buffer circuitry.

The memory (M) may be programmed with computer-readable instructions embodying a method 100, with execution of the instructions ultimately enabling the RCS 50 to control the various joints, brakes, and locking mechanisms of the robotic system 10 as needed to execute and/or switch between available control modes. This may occur in response to a measured or derived weight (arrow W) of the payload 12 as explained below, e.g., from a weight observer (w-OBS) 49, and in response to a possible control mode transition signal (arrow CM). Control modes may include a Position Control Mode in which the parallel robot 30 assumes a commanded position relative to the payload 12, and a Force Control Mode in which the parallel robot 30 applies a commanded force to the payload 12. To that end, a Human-Machine Interface (HMI) device 55, e.g., a touch screen device or a suitable interface executed in logic of the RCS 50, may be used to facilitate determination of the control modes. For instance, an operator in some approaches may manually select one of the control modes, or the RCS 50 may autonomously determine and select the optimal control mode in real-time.

Still referring to FIG. 1, an overarching goal of the present disclosure is to gently move and accurately position the payload 12 within the workspace 13. This is affected by cooperative operation of the serial robots 20A and 20B, each of which in turn may be optionally embodied as 6-axis industrial robots providing translation in three axes, e.g., an xyz Cartesian coordinate frame, and rotation, pitch, and yaw for attitude control, for a total of six degrees of freedom ("6-DoF"). Thus, the serial robots 20A and 20B may be implemented as 6-DoF robots of the type understood in the art.

In the simplified depiction of FIG. 1, for instance, the serial robots 20A and 20B may each include a base 22 and multiple serially-connected arm segments 24, and a three-axis wrist assembly 25 positioned at the distal ends E1 and E2. The base 22 and arm segments 24 are interconnected via revolute joints 28 inclusive of motorized joint actuators, the corresponding angular positions of which are individually measured by joint position sensors 40 and reported as corresponding robot-specific joint positions ($\theta_{R1}$, $\theta_{R2}$, $\theta_{R3}$) to the RCS 50 as part of the control method 100.

During motion control of the serial robots 20A and 20B, even the most minute of position errors and mechanical misalignments will tend to exert strain on the payload 12. The effects of such strain on the payload 12 largely depend on the construction of the payload 12, as will be appreciated by those skilled in the art. It is nevertheless desirable to minimize the magnitude of strain during presentation of the payload 12 in order to protect the payload 12 from damage, whether such damage results from motion of the payload 12 during presentation thereof, or when performing an operation on the presented payload 12.

In a non-limiting illustrative embodiment, for instance, an additional serial robot 20C (R4) may be configured to perform a work operation on the payload 12, e.g., a welding operation on the payload 12 when the additional serial robot 20C is configured as a welding robot as shown. Forces may be imparted to the payload 12 due to other events, e.g., an emergency stop (e-stop) event in which motion of the serial robots 20A and 20B is suddenly arrested by actuation of an e-stop device 52, two of which are represented in FIG. 1 to show multiple possible locations in the workspace 13. Corresponding e-stop signals (arrows 152) may be communicated by the e-stop devices 52 to the RCS 50 as part of the present method 100.

Within the same vein, one of the serial robots 20A or 20B could experience an automatically generated e-stop event at any time due to an internal fault. Thus, the RCS 50 is configured to execute a controlled stop in which the serial robots 20A and 20B and the parallel robot 30 are commanded to stop, while on path using a calibrated highest allowable deacceleration, e.g., a maximum deceleration protective of the structural integrity of the robots 20A, 20B, and 30 as well as the payload 12. While this motion is controlled, such a fault-based automatic e-stop could happen at any time during execution of a given movement sequence. Thus, compensation by the parallel robot 30 for transient errors may be used to aid in resolving transient forces during the exemplary control stop scenario.

Also as part of the present method 100, the RCS 50 may process force signals (arrow F) from the force sensor 21 to sense or estimate strain on the payload 12. Relative to the serial robots 20A and 20B, the parallel robot 30 is able to respond at much higher bandwidth to relieve the strain. That is, the smaller and lower inertia parallel robot 30 will tend to have a higher dynamic performance and faster control loop than the larger, more cumbersome serial robots 20A and 20B. Thus, the multiple robots R1, R2, and R3 of FIG. 1 work together to gently grasp, position, and ultimately present the payload 12 within the workspace 13 while maintaining rigid-body constraints in the resulting motion.

To ensure precision control of the corrective actions of the parallel robot 30 within the intended scope of the present method 100, the parallel robot 30 may be optionally embodied as a Stewart platform or another hexapod as shown, or as a Delta robot or other application-suitable parallel mechanism. As understood in the art, hexapod robots such as the illustrated Stewart platform embodiment (also see FIG. 2) are supported by six telescoping legs or struts 36, also referred to as prismatic actuators, which are individually mounted to end plates 32 and 34. The independently controllable lengths of the struts 36 provide 6-DoF of motion control with micrometer or microradian levels of accuracy.

Although omitted from FIG. 1 for simplicity, control of the struts 36 may be accomplished using servo systems, proportional valves, encoders, and the like, as appreciated in the art. Relative to the serial robots 20A and 20B, the parallel robot 30 enjoys higher stiffness and load-carrying capability due to the arrangement of the multitude of struts 36. Parallel arrangement of the struts 36 likewise causes only the topmost endplate 34 to move, and thus the parallel robot 30 has a lower inertia than that of the serial robots 20A and 20B. This enables use of the parallel robot 30 for dynamic control of the payload 12 as detailed herein. Control may be assisted or optimized using optional observers, including a gravity observer ("g-OBS") 51 and/or an inertia observer ("i-OBS") 53, both of which are described in further detail below.

Figure 2:
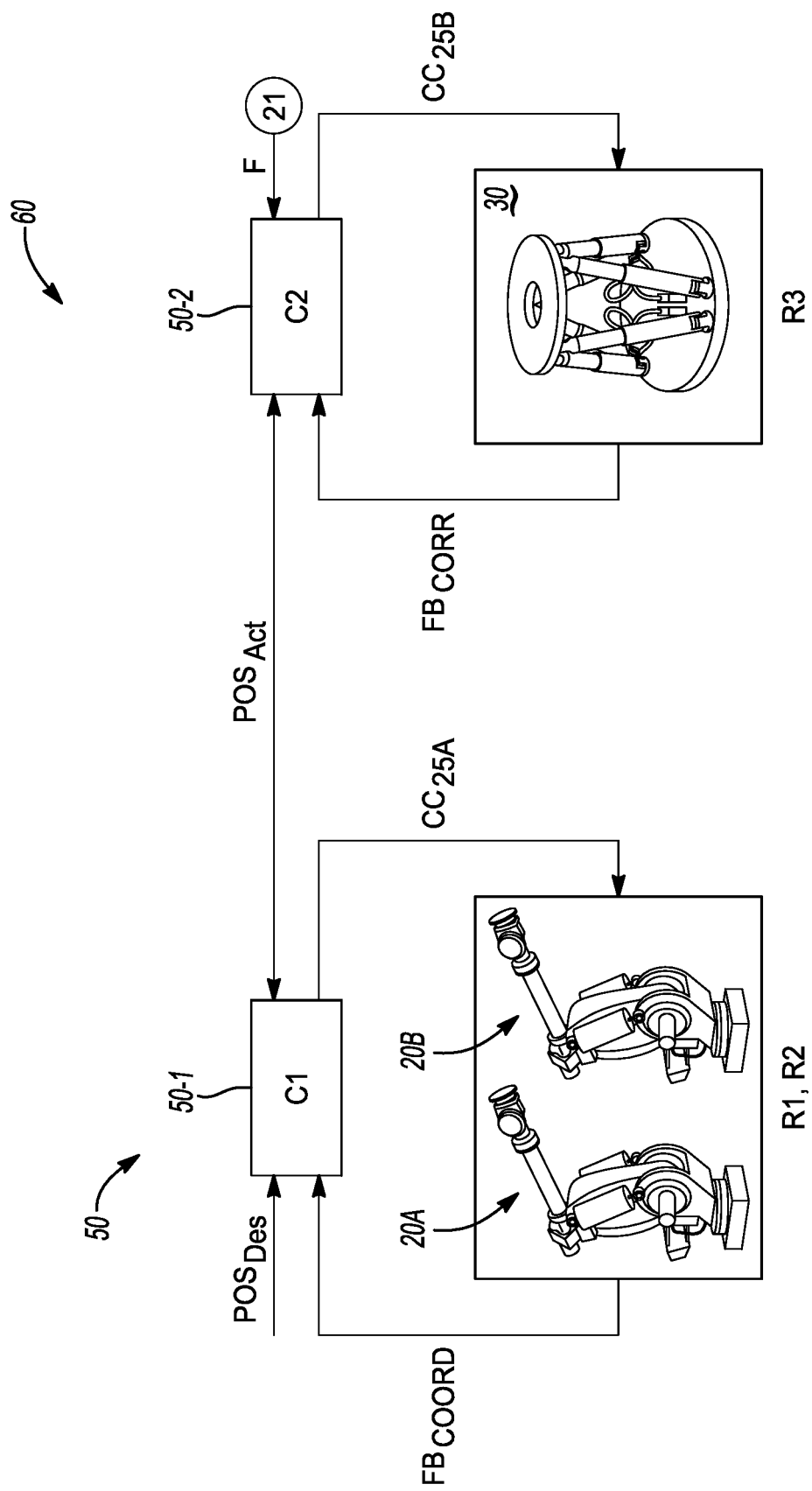
FIG. 2 is a schematic control diagram describing coordinated control of constituent coordinated motion and corrective motion controllers of the robot control system shown in FIG. 1.

Referring now to FIG. 2, a control architecture 60 schematically depicts operation of the coordinated motion controller 50-1 (C1) and the corrective motion controller 50-2 (C2) with respect to multi-axial control of the serial robots 20A (R1) and 20B (R2) as described above with reference to FIG. 1. The serial robots 20A and 20B are securely mounted to ground, either directly or via an intervening vertical or horizontal beam, pedestal, overhead gantry, or other support structure. In contrast, the parallel robot 30 is positioned in series with the serial robot 20B (see FIG. 1), and/or with serial robot 20A in other embodiments. The force sensor 21 is positioned in series with the serial robot 20B (R2) and the parallel robot 30 (R3), and is configured to output a force signal (arrow F) indicative of the measured strain on the payload 12 described above.

When the payload 12 of FIG. 1 is securely grasped and supported by the serial robots 20A and 20B, with the assistance of at least one parallel robot 30, the coordinated motion controller 50-1 receives a desired position ($POS_{Des}$) as an electronic input signal. In a possible implementation, the desired position ($POS_{Des}$) may be generated by control logic of the RCS 50 of FIG. 1 according to a programmed or operator-selected presentation sequence.

For instance, when presenting the payload 12 in the representative form of the vehicle chassis 120 of FIG. 1, such a sequence could entail grasping opposing ends of the chassis 120 using the serial robots 20A and 20B using grippers or other suitable end-effectors, lifting the chassis 120 to a predetermined height above a ground surface, and rotating the chassis 120 about its longitudinal axis to expose a particular work surface. The additional serial robot 20C of FIG. 1, e.g., a welding robot, could then operate on the chassis 120 while the serial robots 20A and 20B hold the chassis 120 steady and support its weight. As part of this exemplary sequence, the serial robots 20A and 20B work simultaneously about a tool center point (TCP) on the vehicle chassis 120, doing so in accordance with rigid body constraints.

As part of this process, the coordinated motion controller 50-1 receives an actual position signal ($POS_{Act}$) of the serial robots 20A and 20B, as measured by the joint position sensors 40 shown in FIG. 1, as well as feedback signals ($FB_{COORD}$) in the form of a measured or calculated position error, i.e., $POS_{Act}$-$POS_{Des}$. The coordinated motion controller 50-1 also outputs the first set of actuator control signals $CC_{25A}$ to each of the serial robots 20A and 20B in real-time to command the various joint actuators of the serials robots 20A and 20B to move to a particular angular position and/or to hold a particular pose as needed based on the desired position ($POS_{Des}$).

Simultaneously with operation of the coordinated motion controller 50-1, the corrective motion controller 50-2 provides slight corrective motion or position of the parallel robot 30 using feedback signals ($FB_{CORR}$) and the measured force (F) from the force sensor 21. Other inputs into the coordinated motion controller 50-1 include the actual position ($POS_{Act}$). The corrective motion controller 50-2 then outputs the second set of actuator control signals ($CC_{25B}$) to the parallel robot 30 in real-time to command the various joint actuators of the parallel robot 30 to move to a particular angular position and/or to hold a particular pose as needed to minimize the strain on the presented payload 12.

With respect to ongoing operation of the corrective motion controller 50-2, force control logic thereof may be based on an impedance model as noted herein, or an admittance model in another implementation. As understood in the art, the general difference between the two control models or modes is that impedance control is used to control an applied force after first detecting deviation from a calibrated setpoint, while admittance control is often used to control motion in response to measurement of a force. Either model or embodying logic thereof may be used by the RCS 50 to compensate for the weight of the payload 12.

For instance, the corrective motion controller 50-2 of FIG. 2 may receive information from the cooperative motion controller 50-1 as to the particular direction/motion vector and location of the payload 12 throughout the above-noted exemplary presentation sequence. Using such information, the corrective motion controller 50-2 may derive the weight (arrow W of FIG. 1) and compensates for the weight as part of the present method 100.

Weight-based compensation in this manner could be augmented by the gravity observer 51 of FIG. 1, which may continuously evaluate the location of a model of the payload 12, e.g., one recorded in memory (M), and provide a stream of weight vectors (arrow 51V) subsequently used to subtract the payload weight component of the forces (arrow F) measured by the force sensor 21. Likewise, the corrective motion controller 50-2 may act on the e-stop signals (arrows 152 of FIG. 1) to maintain a coordinated stop position on the parallel robot 30 to protect the payload 12 during sudden stops resulting from activation of the e-stop device 52.

For continuous motion control scenarios during which the payload 12 of FIG. 1 is being repositioned, the optional inertia observer 53 could estimate dynamic forces (arrow $F_{est}$) that the payload 12 would develop during the particular motions and poses used to present the payload 12 to a given manufacturing process. Some processes could involve continuous motion of the serial robots 20A and 20B relative to the process robots, e.g., serial robot 20C of FIG. 1, such as when arc welding and dispensing where the payload 12 is continuously repositioned to aid and enable favorable process conditions, e.g., with "downhand" welding using a robot-carried arc welding nozzle and torch.

The inertia observer 53 in an illustrative embodiment would work with the weight or gravity observers to provide a complete dynamic and static force estimate, which in turn may be subtracted from forces (arrow F) observed by the force sensor 21. In this manner, unexpected forces could be relieved, compensated for, or nulled by the higher motion bandwidth parallel robot 30. The resulting control of the "net pose" of the payload 12 would thus result in much more accurate positioning of the payload 12, with substantially reduced stress induced in the payload 12 due to the compensation of the dynamic incoordination of the load-carrying serial robots 20A and 20B.

Figure 3:
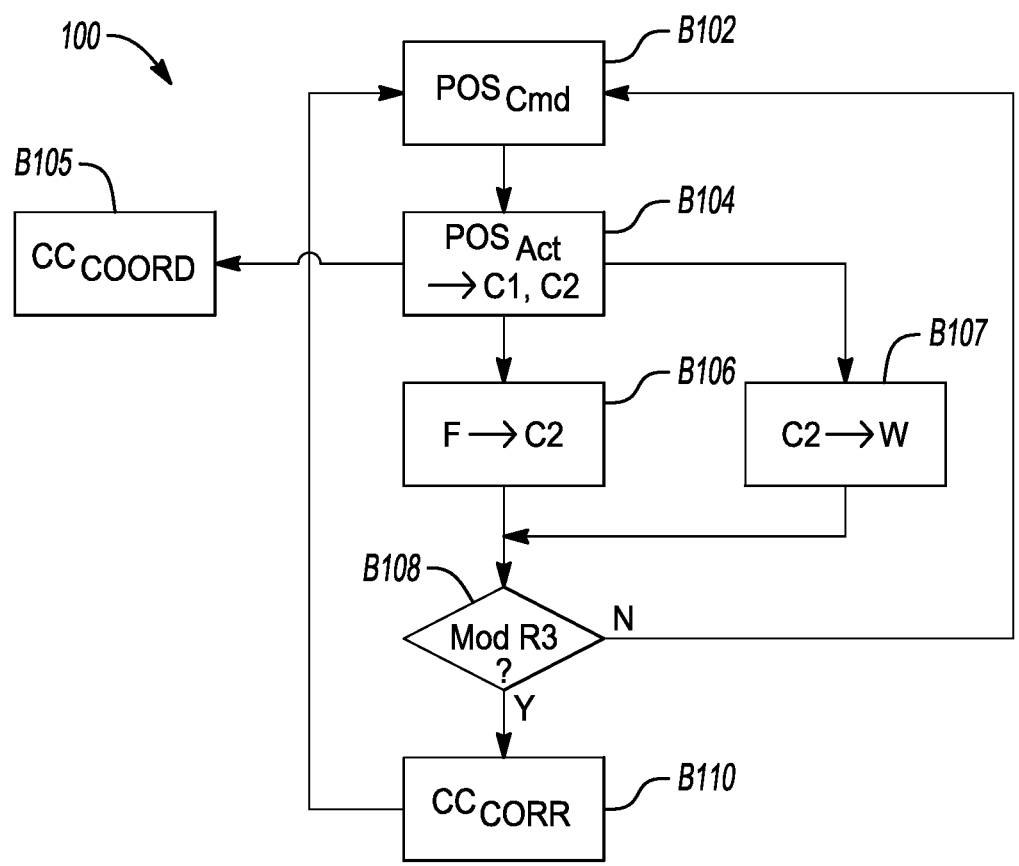
FIG. 3 is a flow chart describing an exemplary method for controlling the robotic system shown in FIG. 1.

Referring to FIG. 3, an embodiment of the method 100 for presenting the payload 12 within the workspace 13 of FIG. 1 is performed with compliant coordinated payload control using the above-described serial robots 20A and 20B and the parallel robot 30. In general, the method 100 includes securely connecting the parallel robot 30 to the distal end E1 of a first serial robot, e.g., the serial robot 20A of FIG. 1. Thereafter, the method 100 includes connecting the parallel robot 30 to the payload 12 such that the parallel robot 30 is disposed between the distal end E2 and the payload 12. The method 100 also includes connecting a second serial robot, e.g., the serial robot 20B, to the same payload 12. In the exemplary embodiment of the vehicle chassis 120, for example, the serial robots 20A and 20B may grasp opposite ends of the vehicle chassis 120 as shown in FIG. 1.

After the serial robots 20A and 20B have been connected to the payload 12 in this manner, the method 100 cooperatively controls motion of the first serial robot 20A, the second serial robot 20B, and the parallel robot 30 via the RCS 50. This entails outputting, via the force sensor 21 situated within a kinematic chain extending between the distal end E1 and the payload 12, a force signal (arrow F of FIGS. 1 and 2) indicative of actual or estimated strain on the payload 12. The method 100 also includes controlling, via the first set of actuator control signals (arrow $CC_{25A}$), multi-axial motion of the respective first and second serial robots 20A and 20B using the coordinated motion controller 50-1. At the same time, the second set of actuator control signals (arrow $CC_{25B}$) is used to control multi-axial motion of the parallel robot 30 in response to the force signal (arrow F) concurrently with control of the multi-axial motion of the respective first and second serial robots 20A and 20B. The desired end effect is a real-time reduction or elimination of undue strain on the payload 12.

An exemplary embodiment of the method 100 as shown in FIG. 3 commences at block B102 with generation and/or receipt of the new position command ("$POS_{Cmd}$"). As noted above, such a command might originate in other logic of the RCS 50 as part of a larger control sequence. The method 100 then proceeds to block B104.

Block B104 entails receiving actual positions of the various robots involved in the cooperative work task, in this instance the serial robots 20A and 20B and the parallel robot 30. The actual positions as determined by the joint sensors 40 of FIG. 1 are communicated to the cooperative motion controller 50-1 and the corrective motion controller 50-2, i.e., "$POS_{Act}$→C1, C2". The communication is dynamic according to a calibrated loop, such that the RCE 50 is continuously apprised of the positions of the robots R1, R2, and R3 within the workspace 13. The method 100 thereafter proceeds to blocks B105, B106, and B107.

At block B105 ($CC_{COORD}$), the actual positions from block B104 are used by the cooperative motion controller 50-1 to generate the requisite first set of actuator control signals (arrow $CC_{25A}$ of FIGS. 1 and 2) for presenting the payload 12 with a desired orientation or attitude, and at a desired position in free space.

At block B106 (F→C2), the force sensor 21 outputs the force signal (arrow F) to the corrective motion controller 50-2. The method 100 proceeds to block B108.

Block B107 (C2→W) includes using the actual positions from block B104 to derive the weight (arrow W of FIG. 1) of the payload 12. The method 100 proceeds to block B108 once the force on the payload 12 and the weight of the payload 12 have been determined.

Block B108 ("Mod R3?") includes determining, via the corrective motion controller 50-2, whether modification is required of the position of or force applied by the parallel robot 30. As part of block B108, the corrective motion controller 50-2 may use the measured force from block B107 as an approximation of the position error between an actual and desired position of the payload 12 of FIG. 1 in three dimensional space. That is, the corrective motion controller 50-2 may start with the expectation that the force sensor 21, once properly calibrated, should ideally measure negligible force during control of the serial robots 20A and 20B. Therefore, when the magnitude of the measured force increases, this is treated as being indicative of unacceptable increase in position error. This error state is then communicated to the corrective motion controller 50-2. The method 100 thereafter proceeds to block B110.

At block B110, the corrective motion controller 50-2 immediately compensates for the position error detected at block B108 by commanding fast-actuation of the parallel robot 30. With weight (W) of the payload 12 determined at block B107, for instance, and with force (F) determined at block B106, the corrective motion controller 50-2 may solve a corrective motion equation, e.g., $Mx''+Bx'=F+W$. The various joints of the parallel robot 30 are then commanded to a respective position via corrective motion control signals ($CC_{25B}$) to relieve strain on the payload 12.

The RCS 50 of FIG. 1 may therefore be used to execute the method 100 shown in FIG. 3 when presenting a rigid part in free space, with such a part represented herein as the payload 12. The present approach contemplates connection of multiple serial robots to the part, with at least one of the serial robots achieving this connection via an intervening parallel robot connected in series therewith. A first controller (C1), described herein as the coordinated motion controller 50-1, is configured to control multi-axial motion of the various serial robots while maintaining integrity of the part. A second controller (C2), described herein as the corrective motion controller 50-2, is configured to control multi-axial motion of the smaller, lower inertia, and more responsive parallel robot(s) concurrently with control by the first controller (C1) of the multi-axial motion of the serial robots.

Collectively, the serial and parallel robots operating under the coordinated and corrective control of the RCS 50 enables fluid presentation and motion of the payload, more accurate assembly, and an accompanying reduction in position error-related strain on the cooperatively-presented part. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:
1. A robotic system for presenting a payload within a workspace, the robotic system comprising:
   a pair of serial robots configured to connect to the payload and cooperatively present the payload within the workspace;
   a parallel robot connected to a distal end of one of the pair of serial robots, such that the parallel robot is disposed between the distal end and the payload;

a force sensor situated within a kinematic chain extending between the distal end and the payload, the force sensor being configured to output a force signal indicative of strain on the payload; and
a robot control system (RCS) having:
 a coordinated motion controller in communication with the pair of serial robots, and configured to output a first set of actuator control signals to the pair of serial robots, the first set of actuator control signals coordinating multi-axial motion of the pair of serial robots as the serial robots simultaneously grip and present the payload within the workspace; and
 a corrective motion controller in communication with the parallel robot and the force sensor, and configured to output a second set of actuator control signals to the parallel robot in response to the force signal, concurrently with the first set of actuator control signals, to thereby impart corrective motion to the payload and thereby reduce the strain thereon.

2. The robotic system of claim 1, wherein the corrective motion controller is configured to transmit the second set of actuator control signals to one or more motorized joint actuators of the parallel robot.

3. The robotic system of claim 1, wherein the force sensor is integral with the parallel robot.

4. The robotic system of claim 1, wherein the parallel robot includes a Stewart platform.

5. The robotic system of claim 1, further comprising:
an additional serial robot in communication with the pair of serial robots and the parallel robot, wherein the additional serial robot is configured to perform a work operation on the payload when the payload is cooperatively presented in the workspace.

6. The robotic system of claim 5, wherein the payload is a vehicle chassis, and wherein the work operation is a welding operation that is performed by the additional serial robot on the vehicle chassis.

7. The robotic system of claim 1, wherein the robot control system is configured to determine a weight of the payload based on an actual position of the pair of serial robots and the parallel robot, and to thereafter use the weight within an impedance control model to determine the second set of actuator control signals.

8. The robotic system of claim 1, wherein the robotic system further comprises:
an additional parallel robot connected to a distal end of one of the pair of serial robots, such that a parallel robot is disposed between a corresponding distal end and the payload for each one of the pair of serial robots; and
wherein the corrective motion controller of the robot control system is in communication with, and configured to output a second set of actuator control signals to, both parallel robots.

9. The robotic system of claim 1, wherein the corrective motion controller is configured, in response to an emergency stop ("e-stop") signal from an e-stop device, to control the parallel robot to a default stop position protective of the payload.

10. The robotic system of claim 1, wherein in response to a control mode transition signal, the corrective motion controller is configured to transition between a position control mode in which the parallel robot assumes a commanded position relative to the payload, and a force control mode in which the parallel robot applies a commanded force to the payload.

11. A robotic control system for use with a robot system having two serial robots and a parallel robot when presenting a payload within a workspace, the parallel robot being disposed between the payload and a distal end of one of the serial robots, the robotic control system comprising:
a coordinated motion controller configured to generate a first set of actuator control signals to control multi-axial motion of the serial robots when cooperatively presenting the payload within the workspace; and
a corrective motion controller in communication with the coordinated motion controller and configured, in response to a force signal indicative of strain on the payload, to output a second set of actuator control signals configured to control multi-axial motion of a parallel robot concurrently with the multi-axial motion of the serial robots, including imparting corrective motion to the payload.

12. The control system of claim 11, further comprising a force sensor configured to output the force signal, and connected to or integral with the parallel robot.

13. The control system of claim 11, wherein the corrective motion controller is configured to determine a weight of the payload based on an actual position of the two serial robots and the parallel robot, and to thereafter use the weight to determine the second set of actuator control signals.

14. The control system of claim 11, wherein the corrective motion controller is configured, in response to an emergency stop ("e-stop") signal from an e-stop switch, to control the multi-axial motion of the parallel robot to a default stop position that is protective of the payload.

15. The control system of claim 11, wherein in response to a control mode transition signal, the corrective motion controller is configured to transition between a position control mode in which the parallel robot assumes a commanded position relative to the payload, and a force control mode in which the parallel robot applies a commanded force to the payload.

16. A method for cooperatively presenting a payload within a workspace, comprising:
connecting a parallel robot to a distal end of a first serial robot;
connecting the parallel robot to the payload, such that the parallel robot is disposed between the distal end and the payload;
connecting a second serial robot to the payload; and
controlling motion of the first serial robot, the second serial robot, and the parallel robot via a robot control system, including:
 measuring, via a force sensor situated within a kinematic chain extending between the distal end and the payload, and a force signal indicative of strain on the payload;
 controlling multi-axial motion of the first serial robot and the second serial robot, including transmitting a first set of actuator control signals to the first serial robot and the second serial robot via a coordinated motion controller of the robot control system; and
 controlling multi-axial motion of the parallel robot in response to the force signal, including transmitting a second set of actuator control signals to the second serial robot via a corrective motion controller of the robot control system, concurrently with the first set of actuator control signals to thereby reduce the strain on the payload.

17. The method of claim 16, further comprising:
controlling motion of a third serial robot via the coordinated motion controller when performing a work operation on the payload.

18. The method of claim 17, wherein controlling the motion of the third serial robot includes performing a welding operation on a vehicle chassis using the third serial robot.

19. The method of claim 16, further comprising:
receiving an emergency stop ("e-stop") signal via the corrective motion controller; and
controlling the multi-axial motion of the parallel robot to a default stop position that is protective of the payload in response to the emergency stop signal.

20. The method of claim 16, further comprising:
receiving a control mode transition signal via the corrective motion controller; and
in response to the control mode transition signal, transitioning via the corrective motion controller between a position control mode in which the parallel robot assumes a commanded position relative to the payload, and a force control mode in which the parallel robot applies a commanded force to the payload.

\* \* \* \* \*